(12) United States Patent
Mahvi

(10) Patent No.: US 9,043,912 B2
(45) Date of Patent: May 26, 2015

(54) METHOD FOR THWARTING APPLICATION LAYER HYPERTEXT TRANSPORT PROTOCOL FLOOD ATTACKS FOCUSED ON CONSECUTIVELY SIMILAR APPLICATION-SPECIFIC DATA PACKETS

(71) Applicant: Mehdi Mahvi, Irvine, CA (US)

(72) Inventor: Mehdi Mahvi, Irvine, CA (US)

( * ) Notice: Subject to any disclaimer, the term of this patent is extended or adjusted under 35 U.S.C. 154(b) by 0 days.

(21) Appl. No.: 14/217,320

(22) Filed: Mar. 17, 2014

(65) Prior Publication Data

US 2014/0289854 A1    Sep. 25, 2014

Related U.S. Application Data

(60) Provisional application No. 61/801,613, filed on Mar. 15, 2013.

(51) Int. Cl.
*H04L 29/06* (2006.01)
(52) U.S. Cl.
CPC ........ *H04L 63/1416* (2013.01); *H04L 63/1458* (2013.01)
(58) Field of Classification Search
CPC .................................................. H04L 63/1416
USPC .......................................................... 726/23
See application file for complete search history.

(56) References Cited

U.S. PATENT DOCUMENTS

| 7,020,783 | B2 | 3/2006 | Vange et al. | |
|---|---|---|---|---|
| 7,478,429 | B2 | 1/2009 | Lyon | |
| 7,921,462 | B2 | 4/2011 | Rooney et al. | |
| 2002/0083175 | A1 | 6/2002 | Afek et al. | |
| 2003/0145232 | A1 | 7/2003 | Poletto et al. | |
| 2006/0242703 | A1* | 10/2006 | Abeni | 726/23 |
| 2008/0134331 | A1* | 6/2008 | Sung Won et al. | 726/22 |
| 2010/0175132 | A1* | 7/2010 | Zawadowskiy et al. | 726/23 |
| 2013/0042322 | A1 | 2/2013 | Yoon | |

* cited by examiner

*Primary Examiner* — Jason K Gee
(74) *Attorney, Agent, or Firm* — San Diego IP Law Group LLP

(57) ABSTRACT

The present invention provides a methodology to thwart attacks that utilize consecutive hypertext transport protocol packets with similar structures, arriving from a plurality of computer systems on a network, such as the Internet, destined for a single or more computer systems on a secondary network, at such a rate with sufficient complexity to produce an effect on the target computer system or systems such that legitimate clients are denied access to requested services, thus creating a "denial of service" situation. The methodology focuses on the dynamic and proactive reassessment of data packet payload content to maintain a running value of similarity or dissimilarity, thus permitting intermediary apparatuses that are performing this computation to create distinction between legitimate clients and illegitimate clients.

7 Claims, 1 Drawing Sheet

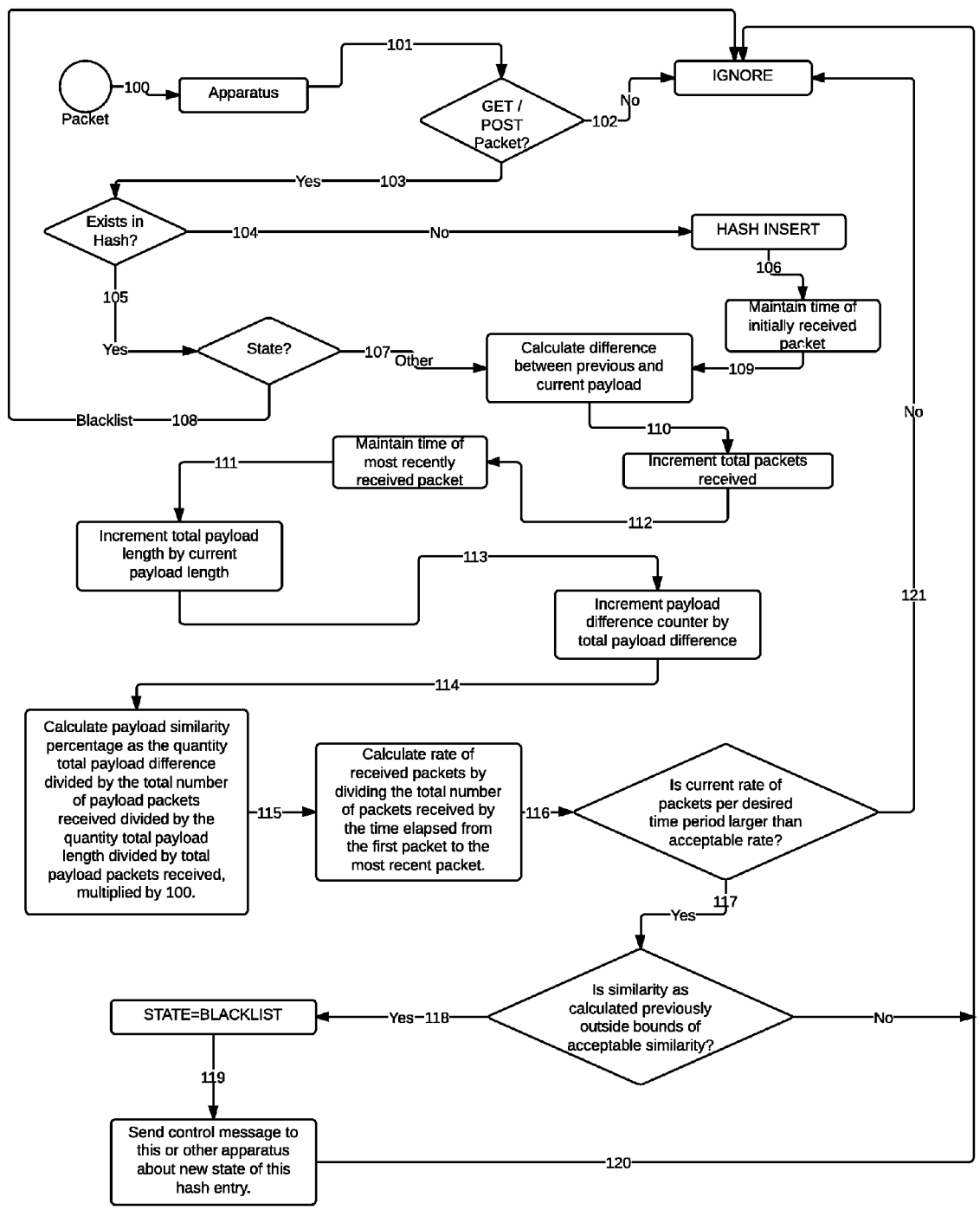

METHOD FOR THWARTING APPLICATION LAYER HYPERTEXT TRANSPORT PROTOCOL FLOOD ATTACKS FOCUSED ON CONSECUTIVELY SIMILAR APPLICATION-SPECIFIC DATA PACKETS

CROSS-REFERENCE TO RELATED APPLICATION

The present application claims priority to U.S. Provisional Patent Application No. 61/801,613, filed Mar. 15, 2013, and entitled "Method for Thwarting Application Layer Hypertext Transport Protocol Flood Attacks Focused on Consecutively Similar Application-Specific Data Packets," the entire disclosure of which is incorporated by reference herein.

BACKGROUND OF THE INVENTION

1. Field of Invention

The invention relates generally to data network communications and more particularly to a technique for thwarting application layer hyptertext transport protocol flood attacks targeting one or more of a plurality of systems on a network, such as the Internet.

2. Description of Related Art

Hypertext transport protocol ("HTTP") is the preeminent mechanism for application layer communication in the world. A would-be attacker can simply generate a sufficient number of "GET" packets to a particular HTTP server to continuously request resources served by the server. Once the server reaches its maximum capacity of "GET" packets per second, the server is no longer capable of responding to legitimate clients. Such an attack is known as a flood attack or "distributed denial of service" ("DDoS") attack. Mitigation systems depend on complex algorithms to create distinctions between legitimate intelligent clients and illegitimate clients attempting to create a "denial of service" condition on the end server. Once this condition has been created, even legitimate intelligent clients can no longer access necessary resources on the server.

U.S. Pat. No. 7,478,429 to Lyon, the disclosure of which is incorporated by reference herein in its entirety, describes a network overload detection and mitigation system and method. Lyon employs a data cleaning center having attack detection and/or mitigation modules that provide DDoS attack-free data to back-end servers. A drawback of Lyon is that it simply absorbs the attack, thus necessitating additional servers to handle the load. It does not provide a mechanism to block the malicious data packets.

U.S. Pat. No. 7,020,783 to Vange et al. ("Vange"), the disclosure of which is incorporated by reference herein in its entirety, describes a system for handling denial of service attacks on behalf of a shared network resource. Vange employs a request processing component deployed within a network having an interface configured to receive requests on behalf of the shared network resource, and a rate control component coupled to the request processing component to selectively forward received requests to the shared network resource at a rate selected to prevent the shared network resource from crashing or becoming undesirably busy. A drawback of Vange is that it simply absorbs the attack, thus necessitating additional servers to handle the load. It does not provide a mechanism to block the malicious data packets.

U.S. Patent Application Publication No. 2002/0083175 to Afek et al. ("Afek"), the disclosure of which is incorporated by reference herein in its entirety, describes a technique for protecting against and/or responding to an overload condition at a node ("victim") in a distributed network to divert traffic otherwise destined for the victim to one or more other nodes, which can filter the diverted traffic, passing a portion of it to the victim, and/or effect processing of one or more of the diverted packets on behalf of the victim. A drawback of Afek is that it does nothing to specifically protect against GET floods. Afek is also not an application layer aware methodology.

U.S. Patent Application Publication No. 2003/0145232 to Poletto et al. ("Poletto"), the disclosure of which is incorporated by reference herein in its entirety, describes an architecture for thwarting denial of service attacks on a victim data center. The system includes a first plurality of data monitors that monitor network traffic flow through the network. The system includes a central controller that receives data from the plurality of monitors, over a hardened, redundant network. The central controller analyzes network traffic statistics to identify malicious network traffic. In one embodiment, a gateway device is disposed to pass network packets between the network and the victim site. The gateway includes a computing device executing a process to build a histogram for any attribute or function of an attribute of network packets and a process to determine if the values of the attribute exceed normal, threshold values expected for the attribute to indicate an attack on the site. A drawback of Poletto is that it does not provide proactive recalculation of GET similarities to effectively mitigate a large percentage of an attack.

U.S. Patent Application Publication No. 2013/0042322 to Yoon, the disclosure of which is incorporated by reference herein in its entirety, describes a technique for defending a DDoS attack. Yoon employs a packet collecting unit to collect a packet in a network, a packet parsing unit to extract at least one header field from the collected packet, and a DDoS attack determining unit to determine whether a DDoS attack against the packet is detected, using a session table and a flow table. A drawback of Yoon is that it is a simplistic approach to mitigating some transport layer attacks and does not provide an application layer aware methodology.

U.S. Pat. No. 7,921,462 to Rooney et al. ("Rooney"), the disclosure of which is incorporated by reference herein in its entirety, describes a technique for detecting DDoS attacks within the Internet by sampling packets at a point or points in Internet backbone connections to determine a packet metric parameter. The packet metric parameter which might comprise the volume of packets received is analyzed over selected time intervals with respect to specified geographical locations in which the hosts transmitting the packets are located. The expected behavior can be employed to identify traffic distortions revealing a DDoS attack. A drawback of Rooney is that metrics are insufficient for providing comprehensive protection against GET floods as they do not factor the packet data content. Rooney is also not an application layer aware methodology.

SUMMARY OF THE INVENTION

The present invention overcomes these and other deficiencies of the prior art by providing a method for thwarting application layer hyptertext transport protocol (HTTP) flood attacks targeting one or more of a plurality of computer systems on a network, such as the Internet. Particularly, the method described herein is aware of the underlying application layer that is encapsulated in the transport control protocol. The method proactively monitors and recalculates data for each source/destination tuple between a client and a server to continually reassess and optimize the decision making process regarding the transmission of GET packets to a server. The method does not exclusively depend on a set of predefined variables controlling the flow rate of data packets based on time metric analysis. Instead, it depends on a dynamically adjusting analysis of fluctuating packet content fingerprints over a period of time.

In an embodiment of the invention, a computer processor implemented method to thwart hypertext transport protocol (HTTP) attacks comprises the steps of: receiving a plurality of HTTP packets, the plurality of HTTP packets comprising a first HTTP packet and a second HTTP packet, wherein the second HTTP packet was received prior to the first HTTP packet; creating a hash of the first HTTP packet using a hash function, wherein the first HTTP packet is a GET request or POST request; determining if the hash is in a list of previously known hashes, wherein each previously known hash in the list of previously known hashes is associated with a state, wherein the state is either blacklist or other; if the hash is a previously known hash and the state is blacklist, then blocking a request associated with the first HTTP packet, or if the hash is a previously known hash and the state is other, or the hash is not is not in the list of previously known hashes, then calculating a difference between a payload of the first HTTP packet and a payload of the second HTTP packet, and calculating a length of the payload of the first HTTP packet; incrementing a counter of total payload length by the calculated length of the payload of the first HTTP packet; incrementing a counter of total difference by calculated difference; calculating a payload similarity percentage based on the total payload difference and total payload length; and if the calculated payload similarity percentage is outside a predetermined acceptable range of acceptable percentages, then setting the state to blacklist if the hash is a previously known hash, or storing the hash in the list of previously known hashes with its associated state set to blacklist. The difference may be a Levenshtein distance. The total payload similarity percentage is the total payload difference divided by the total payload length. The method may further comprise calculating a rate of the received plurality of HTTP packets and performing the step of setting or storing if, and only if, the calculated rate is greater than an acceptable rate. The method may further comprise sending a control message indicating that a the hash has been stored in the list of previously known hashes with its associated state set to blacklist.

An advantage of the present invention is that it provides a mechanism to protect hypertext transport protocol servers on a network from complex attacks that seek to limit or stop its ability to provide resources. The present invention has proven to be extremely effective at thwarting denial of service attacks utilizing consecutive "GET" packets. One advantage of this methodology is the versatility of the hash function employed. Utilizing different hash functions, the present invention obtains different advantages based on the advantages different hash functions provide. Some hash functions provide advantages for disparate sets, while others provide advantages for similar sets. The purpose of the hash function can dictate the application of this methodology. The hash algorithm itself is the bottleneck and not the inherent design of this system.

Another advantage of this methodology is the versatility of the employed similarity function. Some functions can provide comprehensive difference values but be computationally costly, while others can be computationally inexpensive while providing a different level of accuracy. The versatility allows the designer of the system to utilize the appropriate function that dictates the application of this methodology.

Another advantage of this methodology is its versatile applicability in different environments. The present invention can be incorporated into any number of systems which monitor traffic and generate control messages to a system, whether internal or external, to limit, restrict, or allow traffic communication.

Another advantage of this system is in its simplicity and effectiveness of design. The present invention provides effective mitigation against a myriad of denial of service attacks focusing on HTTP GET and POST floods. In production testing, the present invention mitigates a significant portion of HTTP GET and POST floods within an acceptable time period.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows:

FIG. 1 illustrates a process flow diagram according to an embodiment of the invention.

DETAILED DESCRIPTION OF EMBODIMENTS

Further features and advantages of the invention, as well as the structure and operation of various embodiments of the invention, are described in detail below with reference to the accompanying FIG. 1.

The present invention defends against network denial of service attacks, network intrusions, and other network-based attacks, targeting one or more of a plurality of systems on a network, such as the Internet. Systems that undergo various forms of network-based attacks must be defended utilizing comprehensive intermediary systems. These systems can be isolated to a single location, or distributed across the Internet.

The present invention may be implemented as software residing and executing on one or more computers, i.e., apparatuses. The apparatus or set of apparatuses receive network traffic and generate control messages to dictate the flow of particular traffic. The network traffic that is passed through an apparatus includes all network traffic that is desired to be securely managed. This can include network all network traffic or a particular subset off network traffic such as network traffic destined to a particular subsection of the network. Network traffic can originate in any point of presence that the service provider or content provider resides. The apparatus itself also controls the flow of traffic to limit, restrict, or allow such traffic communication based on the control logic described herein.

FIG. 1 illustrates a process flow diagram according to an embodiment of the invention. FIG. 1 abstracts the generation of control messages that can be utilized internally or externally within the system. The system can be generically implemented in a number of systems to provide similar functionality.

In operation, a packet 100 originates into apparatus A. Apparatus A determines the type of HTTP packet at 101. If the packet 100 is not of HTTP type "GET" or "POST" 101, the apparatus ignores packet 102 and no further processing is done. If packet is of HTTP type "GET" or "POST", the apparatus A checks the existence of a hash entry at 104 and 105 in the hash table, which can be any number of available hash tables. No specific hash table is necessary to support the functionality of this methodology. If the hash entry does not exist 104, create the entry and maintain the time and payload of the initially received packet 106. The hash table entry identification comprises the source IP address, destination IP address, source port, and destination port, which can be all hashed together in order to find this data on the next packet that is similar in nature. If the hash entry exists, apparatus A checks the state 105. If the state is blacklist 108, the apparatus A ignores the packet as the parent apparatus or other apparatuses will do what is necessary with the packet 108. In an embodiment of the invention, apparatus A simply monitors traffic and relays the blacklist to another apparatus or system that will then prohibit all further traffic from the source IP address that is responsible for the malicious attack. Alternatively, apparatus A prohibits all further traffic from the source IP address. At this point, the hash table entry is either newly created or an existing hash table entry has been found.

If the state is other 107, e.g., NONE or OPEN, Apparatus A then calculates the difference 109 between the previous and current payload. The difference is used to determine it if's malicious based as described below. If no previous payload exists, the previous payload will simply be an empty or null value. The difference can be calculated using a number of freely existing functions and methods such as "Levenshtein distance," the identification and/or implementation of which is apparent to one of ordinary skill in the art.

Apparatus A then increments the total packets received for the particular hash entry as "packet counter" 110 and maintains the time of most recently received packet 111. Apparatus A then increments total accumulated payload length by total payload length of this packet for all packets in this hash entry 112. Apparatus further increments total accumulated payload difference by total payload difference for this packet in this hash entry 113. The apparatus then calculates the total payload similarity percentage 114 by 1) taking the quantity of total accumulated payload difference divided by the total accumulated packet count, 2) taking the total accumulated payload length divided by the total accumulated packet count, 3) taking the first quantity and divide it by the second quantity, and then 4) multiplying this value by 100.

Apparatus A then calculates the rate of received packets by dividing the total number of packets received by the time elapsed from the first packet to the most recent packet 115. If the current rate of packets per desired time period is in excess of the acceptable rate 116, and the calculated similarity is outside the bounds of acceptable similarity 117, apparatus 102 sets the state of hash entry to blacklist 118. If state is set to blacklist, apparatus 102 sends a control message to this or other apparatus about new state of this hash entry 119. Ignore further processing on packet 120.

In an embodiment of the invention, the acceptable rate used is in the range between 20% and 80%, where anything less than 20% or more than 80% above a rate of 5 packets per second to a particular URL is considered malicious.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method to thwart hypertext transport protocol (HTTP) attacks, the method implemented on a processor and comprising the steps of:
receiving a plurality of HTTP packets, the plurality of HTTP packets comprising a first HTTP packet and a second HTTP packet, wherein the second HTTP packet was received prior to the first HTTP packet;
creating a hash of the first HTTP packet using a hash function, wherein the first HTTP packet is a GET request or POST request;
determining if the hash is in a list of previously known hashes, wherein each previously known hash in the list of previously known hashes is associated with a state, wherein the state is either blacklist or other;
if the hash is a previously known hash and the state is blacklist, then blocking a request associated with the first HTTP packet, or
if the hash is a previously known hash and the state is other, or the hash is not in the list of previously known hashes, then
calculating a difference between a payload of the first HTTP packet and a payload of the second HTTP packet, and
calculating a length of the payload of the first HTTP packet;
incrementing a counter of total payload length by the calculated length of the payload of the first HTTP packet, and
incrementing a counter of total difference by calculated difference;
calculating a payload similarity percentage based on the total payload difference and total payload length; and
when the calculated payload similarity percentage is outside a predetermined acceptable range of acceptable percentages, then
setting the state to blacklist if the hash is a previously known hash, or
storing the hash in the list of previously known hashes with its associated state set to blacklist.

2. The method of claim 1, wherein the difference is calculated as a Levenshtein distance.

3. The method of claim 1, further comprising recording a time that the first HTTP packet was received.

4. The method of claim 1, wherein the total payload similarity percentage is the total payload difference divided by the total payload length.

5. The method of claim 1, further comprising calculating a rate of the received plurality of HTTP packets and performing the step of setting or storing if, and only if, the calculated rate is greater than an acceptable rate.

6. The method of claim 1, wherein the second HTTP packet was received immediately prior to the first HTTP packet.

7. The method of claim 1, further comprising sending a control message indicating that a the hash has been stored in the list of previously known hashes with its associated state set to blacklist.

* * * * *